(12) United States Patent
Price et al.

(10) Patent No.: US 6,598,926 B1
(45) Date of Patent: Jul. 29, 2003

(54) TRANSFORMABLE REAR SEAT FOR A VEHICLE

(75) Inventors: Clifford Lee Price, Sterling Heights, MI (US); Heidi H. McAdoo-Wilson, Windsor (CA); Mark R. Hinzmann, Allen Park, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/267,503

(22) Filed: Oct. 9, 2002

(51) Int. Cl.[7] .............................................. B60N 2/02
(52) U.S. Cl. ............................ 296/65.09; 296/65.16; 296/69; 297/334; 297/335; 297/341
(58) Field of Search ...................... 296/64, 65.01, 296/66, 65.05, 65.09, 65.16, 37.8, 37.16, 24.1, 69; 297/334, 335, 336, 341; 160/226, 227

(56) References Cited

U.S. PATENT DOCUMENTS

| 2,916,325 A | * | 12/1959 | Estes et al. ................... 296/66 |
| 2,926,951 A | * | 3/1960 | Koplin ........................ 296/66 |
| 3,311,405 A | * | 3/1967 | Brennan et al. ............... 296/66 |
| 5,482,349 A | * | 1/1996 | Richter et al. ................ 297/15 |
| 5,588,707 A | * | 12/1996 | Bolsworth et al. ...... 297/378.12 |
| 5,934,732 A | * | 8/1999 | Jakubiec ................... 296/65.01 |
| 6,012,755 A | | 1/2000 | Hecht et al. ............. 296/65.03 |
| 6,070,934 A | * | 6/2000 | Schaefer et al. ............. 297/14 |
| 6,142,552 A | * | 11/2000 | Husted et al. ........... 296/65.09 |
| 6,183,033 B1 | * | 2/2001 | Arai et al. ............... 296/65.09 |
| 6,196,613 B1 | * | 3/2001 | Arai ....................... 296/65.13 |
| 6,347,834 B1 | | 2/2002 | Couasnon .................. 297/341 |

* cited by examiner

Primary Examiner—Stephen L. Gordon
Assistant Examiner—Patricia L. Engle
(74) Attorney, Agent, or Firm—Laura C. Hargitt

(57) ABSTRACT

A stowable seating apparatus optimizes vertical space when stowed by positioning its component elements such that their minimum dimensions are vertical, and by avoiding overlapping of component elements. The stowable seating apparatus facilitates avoidance of packaging constraints when stowed because of combined movement of both a seat cushion and a seatback. The design of the stowable seating apparatus is easily modifiable to accommodate the differing packaging constraints of different vehicle interiors.

16 Claims, 5 Drawing Sheets

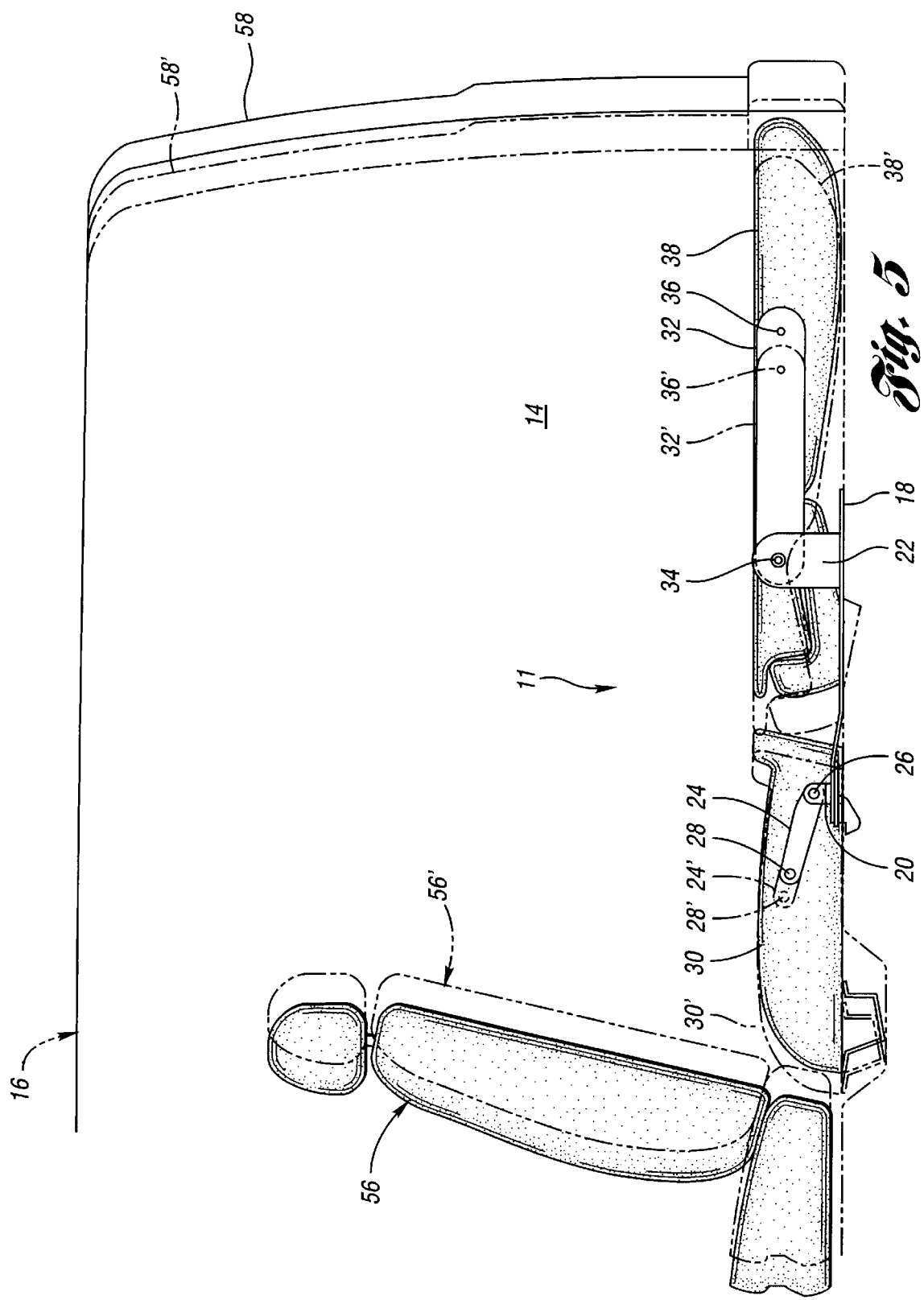

TRANSFORMABLE REAR SEAT FOR A VEHICLE

FIELD OF THE INVENTION

The present invention relates to seating systems for vehicles that fold or are otherwise configurable to reduce the vertical space that is occupied by the seating system.

BACKGROUND OF THE INVENTION

Many vehicles have a cargo area located at the rear of the vehicle. The cargo area is often bordered on one side by a passenger seating apparatus that folds or is otherwise configurable to reduce the vertical space occupied by the seating apparatus and thereby expand the cargo area.

The prior art includes seating apparatuses that are removable from the vehicle to expand the cargo area. Removable seating apparatuses maximize cargo space when removed because no space within the vehicle is occupied by the seating apparatus. Removable seating apparatuses are also advantageous because a flat vehicle floor may be exposed when the seating apparatus is removed, thereby facilitating cargo loading and increasing cargo stability during transportation.

Removal of a seating apparatus from a vehicle as a means to expand the cargo area may result in certain disadvantages. Seating apparatuses may be heavy or awkward and may therefore require significant physical exertion to remove from a vehicle. A vehicle user must have a place to safely store a seating apparatus when it is removed from a vehicle. The storage problem is exacerbated when a vehicle user must remove a seating apparatus to load cargo at a location remote from the vehicle user's residence or place of business because inadequate storage means at the remote location may leave the seating apparatus vulnerable to damage or theft. Furthermore, the vehicle user must return to the place of removal to retrieve the seats.

The prior art also includes seating apparatuses that are stowable within a vehicle or otherwise configurable to reduce the vertical space occupied by the seating apparatuses and thereby expand the cargo area. Typically, a surface of the stowed seating apparatus will function as a cargo floor for the expanded cargo area. For example, some seating apparatuses have a seatback that rotates forward to lie horizontally above a seat cushion, and the exposed surface of the folded seatback serves as a cargo floor.

The prior art stowable seating apparatuses enable expansion of the cargo area without the drawbacks associated with seating apparatus removal, but typically do not optimize vertical cargo space within the vehicle because the seatback does not rest horizontally directly upon the vehicle floor when in its stowed position. Vehicle floor surface area is characterized by protrusions, such as other seating apparatuses and rear lift gates. These protrusions are significant packaging constraints that limit the ability of the seatback to rest directly upon the vehicle floor. Furthermore, if the seatback is folded such that its occupiable surface is exposed, damage could occur to the seating surface by cargo placed upon it.

U.S. Pat. No. 6,347,834, issued Feb. 19, 2002 to Couasnon, discloses a stowable seating apparatus wherein the seatback rests horizontally along the surface of the vehicle floor. The effects of packaging constraints are alleviated by a seat cushion configured to move forward when the seatback member is placed in its stowed position, and by a seatback member configured to rotate when stowed such that the occupiable surface is juxtaposed to the surface of the vehicle floor when in the stowed position. The invention disclosed and claimed in the '834 patent is mechanically complex, and the design is not easily modifiable by automotive designers for use in vehicles with differing packaging constraints.

DISCLOSURE OF THE INVENTION

A stowable seating apparatus maximizes vertical cargo space in a vehicle when the seating apparatus is in its stowed position. The seating apparatus is characterized by its mechanical simplicity and adaptable design that easily accommodates differing packaging constraints found in different vehicle interiors.

The seating apparatus comprises a first bracket and a second bracket mounted with respect to a vehicle floor a fixed distance apart. A first link with two pivotable connections is pivotably connected at one pivotable connection to the first bracket and is pivotably connected at the other to a seat cushion member at a location on the seat cushion member. A second link with two pivotable connections is pivotably connected at one pivotable connection to the second bracket and is pivotably connected at the other to a seatback member at a location on the seatback member. The seatback member has an occupiable surface against which an occupant of the seating apparatus rests. The pivotable connections of the first and second links to the first and second brackets, respectively, are a fixed and non-adjustable distance apart.

The distance between the first bracket and the second bracket; the distance between the pivotable connections on the first link; the distance between the pivotable connections on the second link; the locations on the seat cushion member and the seatback member; and the distance between the pivotable connections of the first and second links to the first and second brackets, respectively, are selected, or predetermined, such that the seating apparatus is moveable between an upright, occupiable configuration and a stowed configuration.

In the upright, occupiable configuration, the seatback member is generally upright, with the occupiable surface facing a generally forward direction. The seatback member extends from an upper extent to a lower extent. The lower extent of the seatback member substantially abuts the rear portion of the seat cushion member.

In the stowed configuration, the first link is rotated about its pivotable connection to the first bracket, thereby altering the placement of the seat cushion member. The second link is rotated about its pivotable connection to the second bracket and the seatback member is rotated about its pivotable connection to the second link, such that the upper extent of the seatback member is adjacent to the rear portion of the seat cushion member and the occupiable surface is juxtaposed to the vehicle floor.

The stowable seating apparatus of the invention maximizes vertical cargo space when in its stowed position by positioning the seatback member such that its smallest dimension, i.e., its thickness, is vertically oriented; by eliminating or minimizing overlap between the seat cushion member and the seatback member; and by positioning the seatback member closely adjacent to the vehicle floor.

The combined movements of the seat cushion member and the seatback member enable designers to configure the seating apparatus to avoid packaging constraints such as other seating apparatuses and rear liftgates by increasing vehicle floor surface area available for the seatback member to rest upon.

The stowable seating apparatus of the invention also improves upon the prior art because its design is readily and easily reconfigurable to adapt to vehicles of differing design constraints. Modification of the lengths of the links, for example, will yield significant changes in the placement of the seat cushion member and seatback member relative to the vehicle floor.

Correspondingly, a method for reconfiguring the design of a stowable seating apparatus for different vehicle interior configurations is provided. The method includes designing a stowable seating apparatus for a first vehicle interior configuration, wherein the stowable seating apparatus includes the elements and characteristics of the seating apparatus described above.

The method also includes redesigning the stowable seating apparatus for a second vehicle interior configuration by changing the predetermined distance between the pivotable connections of the first link, the predetermined distance between the pivotable connections of the second link, the predetermined location of the pivotable connection of the first link on the seat cushion member, the predetermined location of the pivotable connection of the second link on the seatback member, or the predetermined distance between the pivotable connection of the first and second links to the first and second brackets, respectively.

The above objects, features, advantages, and other objects, features, and advantages, of the present invention are readily apparent from the following detailed description of the best mode for carrying out the invention when taken in connection with the accompanying drawings.

BRIEF DESCRIPTION OF THE DRAWINGS

FIG. 5 is a schematic side elevational view of the stowable seating apparatus in a stowed configuration, and a phantom line view showing the effect of varying the lengths of the first and second link.

DETAILED DESCRIPTION OF THE PREFERRED EMBODIMENT

Figure 1:
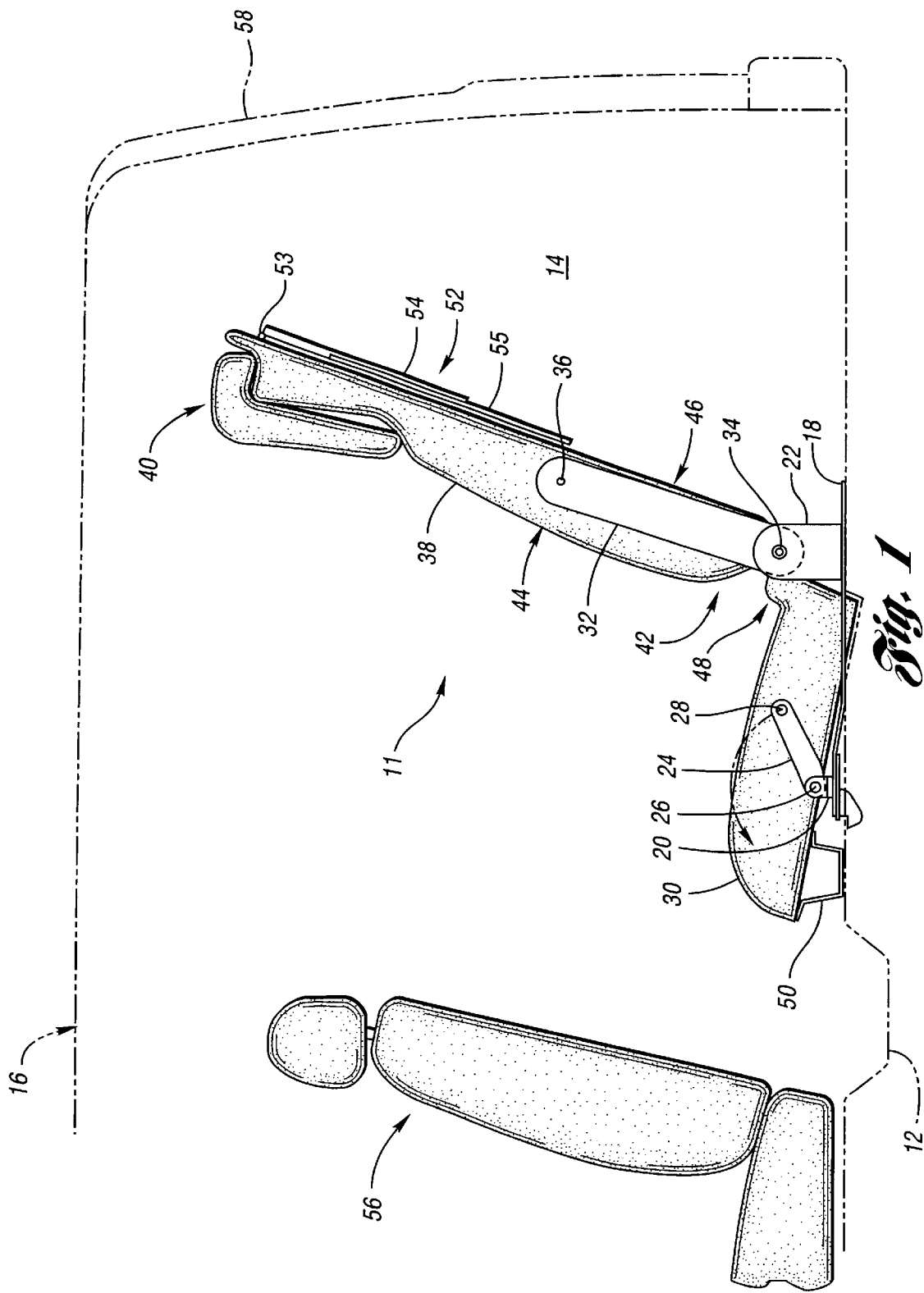
FIG. 1 is a schematic side elevational view of the stowable seating apparatus in an upright, occupiable configuration.

Referring to FIGS. 1–4, a stowable seating apparatus 11 is mounted to a vehicle floor 12 and is adjacent to a cargo area 14 within a motor vehicle 16. The stowable seating apparatus 11 includes a rigid base member 18 mounted to the vehicle floor 12. The rigid base member 18 includes a first bracket 20 and a second bracket 22 spaced a distance apart. A first link 24 having two pivotable connections 26, 28 is pivotably connected at one pivotable connection 26 to the first bracket 20 and is pivotably connected at the other pivotable connection 28 to a seat cushion member 30. A second link 32 having two pivotable connections 34, 36 is pivotably connected at one pivotable connection 34 to the second bracket 22 and is pivotably connected at the other pivotable connection 36 to a seatback member 38. The pivotable connections 26, 34 of the first and second links 24, 32 to the first and second brackets 20, 22, respectively, are a fixed and non-adjustable distance apart.

Figure 3:
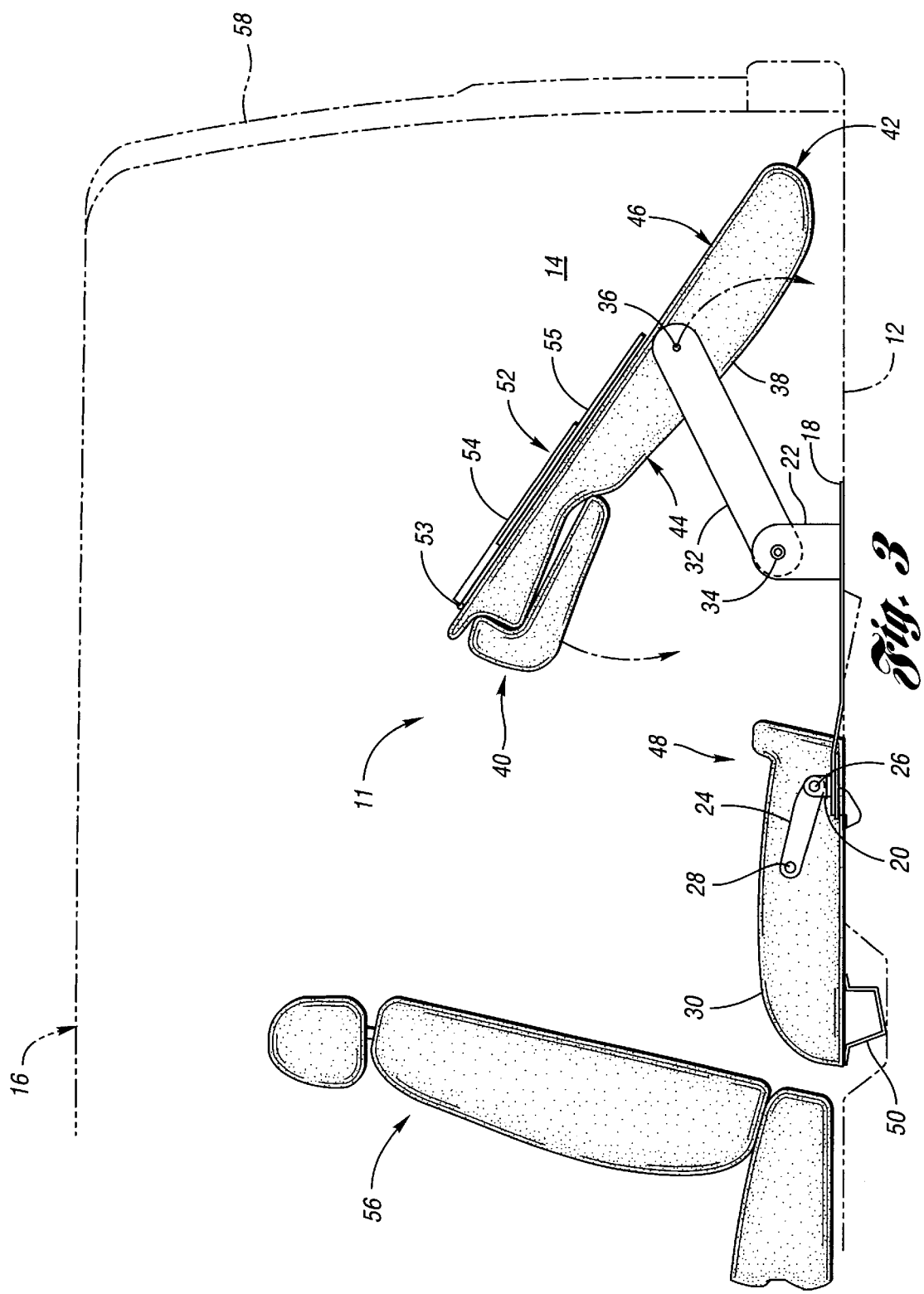
FIG. 3 is a schematic side elevational view of the stowable seating apparatus in a progressive second intermediate configuration.
Figure 4:
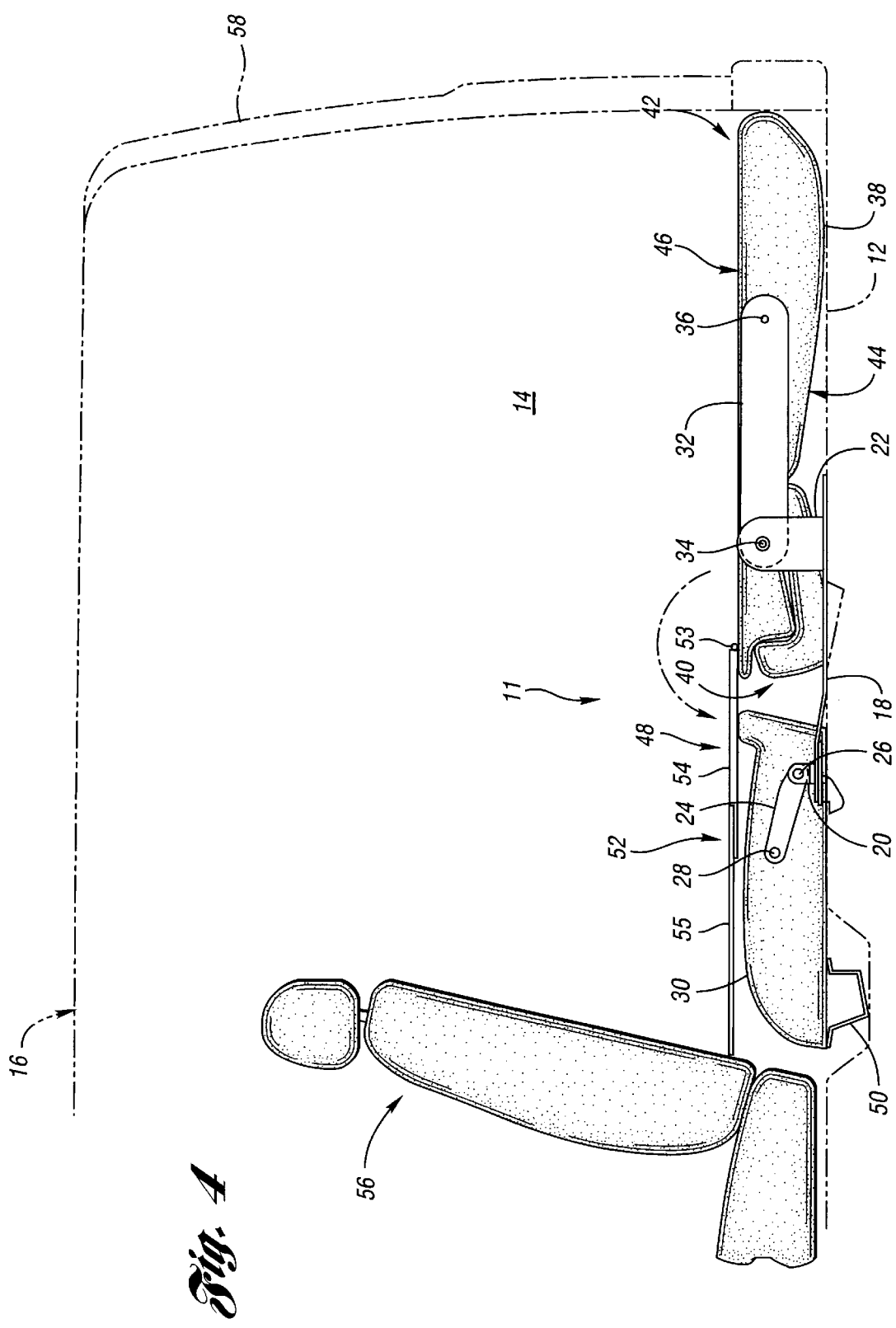
FIG. 4 is a schematic side elevational view of the stowable seating apparatus in a stowed configuration.

The distance between the first bracket 20 and the second bracket 22; the distance between the pivotable connections 26, 28 of the first link 24; the distance between the pivotable connections 34, 36 of the second link 32; the location of the pivotable connection 28 of the first link 24 on the seat cushion member 30; the location of the pivotable connection 36 of the second link 32 on the seatback member 38; and the distance between the pivotable connections 26, 34 of the first and second links 24, 32 to the first and second brackets 20, 22, respectively, are selected, or predetermined, such that the seating apparatus 11 is moveable between an upright, occupiable configuration, as depicted in FIG. 1, and a stowed configuration, as depicted in FIG. 4. The seating apparatus 11 depicted in FIGS. 1–4 provides one working combination of these predetermined dimensions and locations. Other working combinations of other predetermined dimensions and locations will be apparent to those skilled in the art within the scope of the present invention.

The stowable seating apparatus 11 is depicted in the upright, occupiable configuration in FIG. 1. The seatback member 38 is generally upright, extending from an upper extent 40 to a lower extent 42, with an occupiable surface 44 generally facing a forward direction. An occupant of the seating apparatus 11 rests against the occupiable surface 44. To maximize occupant comfort, the occupiable surface 44 should be a soft, pliant material such as leather or fabric, and be adjacent to springs or padding in the seatback member 38.

A cargo load surface 46 is opposite the occupiable surface 44 and generally faces the cargo area 14 when the seating apparatus 11 is in the upright, occupiable configuration. The cargo load surface 46 faces upward and forms part of the lower surface of the extended cargo area 14 when the seating apparatus 11 is in the stowed configuration. Ideally, the cargo load surface 46 will be a durable material to avoid damage caused by the weight or movement of cargo placed upon it.

A rearward portion 48 of the seat cushion member 30 is in close proximity to the lower extent 42 in the occupiable configuration. The pivotable connection 28 between the seat cushion member 30 and the first link 24 is located rearward of the pivotable connection 26 between the first link 24 and the first bracket 20 in the occupiable configuration. A protrusion 50 on the seat cushion member 30 raises the front portion of the seat cushion member 30 for occupant comfort. It will be apparent to those skilled in the art how to employ a releasable locking means for retaining the seat cushion member 30 and seatback member 38 in the occupiable configuration.

Figure 2:
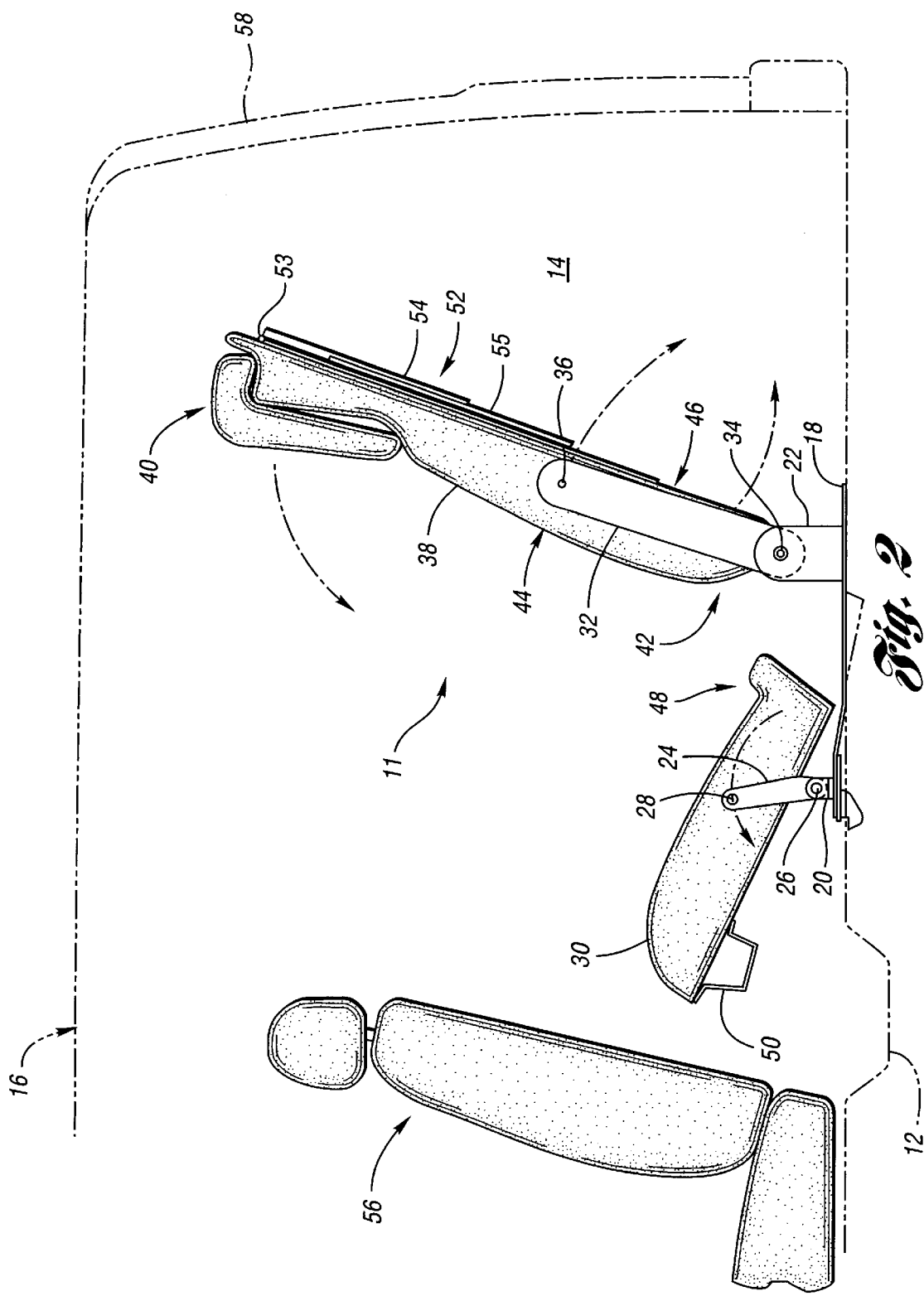
FIG. 2 is a schematic side elevational view of the stowable seating apparatus in a progressive first intermediate configuration.

FIG. 2 illustrates a first progressive intermediate configuration of the stowable seating apparatus 11 in transition from the occupiable configuration to the stowed configuration. The seat cushion member 30 is moved forward, away from the seatback member 38. The first link 24, which rotates about its pivotable connection 26 to the first bracket 20, limits the movement of the seat cushion member 30. The predetermined distance between the pivotable connections 26, 28 of the first link 24 therefore determines, in part, the stowed position of the seat cushion member 30.

FIG. 3 depicts a second progressive intermediate configuration of the stowable seating apparatus 11 in transition from the occupiable configuration to the stowed configuration. The seat cushion member 30 is in its stowed position, forward of its occupiable position. The seatback member 38 is rotated about its pivotable connection 36 to the second link 32 such that the occupiable surface 44 faces downward, and the cargo load surface 46 faces upward. The second link 32 rotates about its pivotable connection 34 to the second bracket 22, and limits the movement of the seatback member 38. The predetermined distance between the pivotable connections 34, 36 of the second link 32 therefore determines, in part, the stowed position of the seatback member 38.

FIG. 4 depicts the stowable seating apparatus 11 in its fully stowed configuration. The seatback member 38 is substantially horizontal. The occupiable surface 44 is juxtaposed to the vehicle floor 12, and the cargo load surface 46 faces upward and functions as a load floor for the expanded cargo area 14. The upper extent 40 is adjacent to the rearward portion 48 of the seat cushion member 30. Vertical cargo space is maximized because the seatback member 38 is positioned closely adjacent to the vehicle floor 12 such that its smallest dimension, its thickness, is vertical. The constraint imposed by the rear liftgate 58 on the placement of the seatback member 38 is minimized because the forward movement of the seat cushion member 30 provides forwardly-located surface area on the vehicle floor 12 upon which the stowed seatback member 38 rests.

A flipper panel 52 is connected to the cargo load surface 46 by a hinge 53. When the seating apparatus 11 is in the upright, occupiable configuration, the flipper panel 52 is stored by laying along the cargo load surface 46. When the seating apparatus 11 is in the stowed configuration, the flipper panel 52 is rotated or pivoted about the hinge 53 to extend forward from its connection to the cargo load surface 46. The flipper panel 52 functions to protect the seat cushion member 30 from stored cargo and provides a flat surface that is substantially coplanar with the cargo load surface 46. The flipper panel 52 may have a fixed length portion 54 and a telescoping portion 55 such that the flipper panel 52 is variably telescopically extendible and retractable to facilitate compact storage.

Designers can reconfigure the design of the stowable seating apparatus 11 to accommodate the differing packaging constraints of different vehicle interiors. Factors that affect the final placement of the seat cushion member 30 and the seatback member 38 in the stowed position include the distance between the first bracket 20 and the second bracket 22, the distance between the pivotable connections 26, 28 of the first link 24, the distance between the pivotable connections 34, 36 of the second link 32, the location of the pivotable connection 28 of the first link 24 on the seat cushion member 30, the location of the pivotable connection 36 of the second link 32 on the seatback member 38, and the distance between the pivotable connections 26, 34 of the first and second links 24, 32 to the first and second brackets 20, 22, respectively. A designer can therefore effectuate a change in the final placement of the seat cushion member 30 or the seatback member 38 by altering or adjusting these factors.

For example, FIG. 5 illustrates how changes in the distance between the pivotable connections 26, 28 of the first link 24 and the distance between the pivotable connections 34, 36 of the second link 32 alter the final placement of the seat cushion member 30 and seatback member 38 in the stowed configuration. Such changes may be used to avoid constraints such as those imposed by an intermediate seating apparatus 56 or a rear liftgate 58.

Referring to FIG. 5, the packaging constraints of a first vehicle interior, represented by the rear liftgate 58, do not result in interference between the seatback member 38 in the stowed position and the rear liftgate 58. However, if the seating apparatus 11 is installed in a second vehicle interior having different packaging constraints, represented in phantom by a more forwardly-located rear liftgate 58', the more forwardly-located rear liftgate 58' interferes with the final placement of the seatback member 38 in the stowed position. A shortened second link 32' with reduced distance between its pivotable connections 34, 36' will result in a more forwardly-placed seatback member 38' in the stowed configuration. Interference between the more forwardly-placed seatback member 38' and the seat cushion member 30 is avoided with a lengthened first link 24' with increased distance between its pivotable connections 26, 28'. The lengthened first link 24' results in a more forwardly-placed seat cushion member 30'.

Similarly, an intermediate seating apparatus 56 may interfere with the placement of the seat cushion member 30. This situation is illustrated in FIG. 5, wherein in phantom, a more rearwardly-placed intermediate seating apparatus 56' interferes with the more forwardly-placed seat cushion member 30'. Interference is avoided by using a shorter first link 24.

Although the description of this invention has been given with reference to a particular embodiment, it is not to be construed in the limiting sense. Many variations and modifications will now occur to those skilled in the art. For a definition of the invention, reference is made to the appended claims.

What is claimed is:

1. A stowable seating apparatus, comprising:
a seat cushion member having a rearward portion;
a first bracket;
a first link having two pivotable connections spaced a predetermined distance apart, the first link being pivotably connected at one pivotable connection to the first bracket and pivotably connected at the other pivotable connection to the seat cushion member at a predetermined location on the seat cushion member;
a seatback member having an occupiable surface;
a second bracket mounted in a fixed, predetermined location relative to the first bracket; and
a second link having two pivotable connections spaced a predetermined distance apart, one pivotable connection of the second link being pivotably connected to the second bracket and the other pivotable connection of the second link being pivotably connected to the seatback member at a predetermined location on the seatback member, the pivotable connection between the first link and the first bracket being a predetermined fixed distance from the pivotable connection between the second link and the second bracket;
wherein the stowable seating apparatus is moveable between
a first configuration in which the seatback member is generally upright and extends from an upper extent to a lower extent, the occupiable surface of the upright seatback member is generally facing a forward direction, and the seat cushion member is positioned such that the rearward portion of the seat cushion member is closely adjacent to the lower extent of the seatback member, and
a second configuration in which the seat cushion member is forward of its position in the first configuration, the seatback member is substantially horizontal, and the upper extent of the seatback member substantially abuts the rearward portion of the seat cushion member.

2. The stowable seating apparatus of claim 1 further comprising a rigid base member to which the first bracket and the second bracket are mounted.

3. The stowable seating apparatus of claim 1, wherein the seatback member has a cargo load surface opposite the occupiable surface, and further comprising a panel movably mounted with respect to the cargo load surface and configured to extend over the seat cushion member from the cargo load surface when the seating apparatus is in the second configuration.

4. The stowable seating apparatus of claim 3, wherein the panel is pivotably connected to the cargo load surface.

5. The stowable seating apparatus of claim 4, wherein the panel is variably extendible and retractable.

6. The stowable seating apparatus of claim 4, wherein the panel is variably telescopically extendible and retractable.

7. The seating apparatus of claim 1, wherein the seatback member has a cargo load surface opposite the occupiable surface and the cargo load surface is flat.

8. A vehicle having a stowable seating apparatus, the vehicle comprising:
   a vehicle floor;
   a seat cushion member having a rearward portion;
   a first bracket mounted with respect to the vehicle floor;
   a first link having two pivotable connections spaced a predetermined distance apart, the first link being pivotably connected at one pivotable connection to the first bracket and pivotably connected at the other pivotable connection to the seat cushion member at a predetermined location on the seat cushion member;
   a seatback member having an occupiable surface;
   a second bracket mounted with respect to the vehicle floor a fixed, predetermined distance from the first bracket; and
   a second link having two pivotable connections spaced a predetermined distance apart, one pivotable connection of the second link being pivotably connected to the second bracket and the other pivotable connection of the second link being pivotably connected to the seatback member at a predetermined location on the seatback member, the pivotable connection between the first link and the first bracket being a predetermined fixed distance from the pivotable connection between the second link and the second bracket;
   wherein the seating apparatus is moveable between
      a first configuration in which the seatback member is generally upright and extends from an upper extent to a lower extent, the occupiable surface of the upright seatback member is generally facing a forward direction, and the seat cushion member is positioned such that the rearward portion of the seat cushion member is closely adjacent to the lower extent of the seatback member, and
      a second configuration in which the seat cushion member is forward of its position in the first configuration, the seatback member is substantially horizontal, the upper extent of the seatback member substantially abuts the rearward portion of the seat cushion member, and the seating surface is juxtaposed to the vehicle floor.

9. The vehicle of claim 8, further comprising a rigid base member fixed with respect to the vehicle floor and to which the first bracket and the second bracket are mounted.

10. The vehicle of claim 8, wherein the seatback member has a cargo load surface opposite the occupiable surface, and further comprising a panel movably mounted with respect to the cargo load surface and configured to extend over the seat cushion member from the cargo load surface when the seating apparatus is in the second configuration.

11. The vehicle of claim 10, wherein the panel is pivotably connected to the cargo load surface.

12. The vehicle of claim 11, wherein the panel is variably extendible and retractable.

13. The vehicle of claim 10, wherein the panel is variably telescopically extendible and retractable.

14. The vehicle of claim 8, wherein the seatback member has a cargo load surface opposite the occupiable surface and the cargo load surface is flat.

15. A vehicle having a stowable seating apparatus, the vehicle comprising:
   a vehicle floor;
   a rigid base member mounted with respect to the vehicle floor;
   a seat cushion member having a rearward portion;
   a first bracket mounted to the rigid base member;
   a first link having two pivotable connections spaced a predetermined distance apart, the first link being pivotably connected at one pivotable connection to the first bracket and pivotably connected at the other pivotable connection to the seat cushion member at a predetermined location on the seat cushion member;
   a seatback member having an occupiable surface and a flat cargo load floor opposite the occupiable surface;
   a second bracket mounted to the rigid base member a predetermined fixed distance from the first bracket;
   a second link having two pivotable connections spaced a predetermined distance apart, one pivotable connection of the second link being pivotably connected to the second bracket and the other pivotable connection of the second link being pivotably connected to the seatback member at a predetermined location on the seatback member, the pivotable connection between the first link and the first bracket being a fixed, predetermined distance from the pivotable connection between the second link and the second bracket;
   a hinge; and
   a panel mounted to the cargo load surface of the seatback member by the hinge, the panel being variably extendible and retractable;
   wherein the seating apparatus is moveable between
      a first configuration in which the seatback member is generally upright and extends from an upper extent to a lower extent, the occupiable surface of the upright seatback member is generally facing a forward direction relative to the seating apparatus, and the seat cushion member is positioned such that the rearward portion of the seat cushion member is closely adjacent to the lower extent of the seatback member, and
      a second configuration in which the seat cushion member is forward of its position in the first configuration, the seatback member is substantially horizontal, the upper extent of the seatback member substantially abuts the rearward portion of the seat cushion member, and the occupiable surface is juxtaposed to the vehicle floor; and
   wherein the panel is configured to extend over the seat cushion member from the cargo load surface when the seating apparatus is in the second configuration.

16. A stowable seating apparatus, comprising:
   a seat having horizontal use and stowed positions;
   a seatback having upright use and horizontal stowed positions;
   a base for movably supporting the seat and the seatback;

the base having first and second links pivotably connected to the base at a fixed distance from each other, the first link being pivotably connected to the seat and the second link being pivotably connected to the seatback, the lengths of the first and second links being predetermined so that the seat can pivot in one direction from its horizontal use position to its horizontal stowed position and so that the seatback can pivot in the opposite direction toward its stowed position and invert from its upright position to its stowed position.

* * * * *